United States Patent [19]
Falater

[11] Patent Number: 5,225,764
[45] Date of Patent: Jul. 6, 1993

[54] VOLTAGE REGULATING CIRCUITRY TO VARY THE ALTERNATOR FIELD COIL DRIVE AT A RATE DEPENDENT UPON A ROTOR VELOCITY SIGNAL

[75] Inventor: Scott L. Falater, Phoenix, Ariz.

[73] Assignee: SGS-Thomson Microelectronics, Inc., Carrollton, Tex.

[21] Appl. No.: 801,766

[22] Filed: Nov. 29, 1991

[51] Int. Cl.$^5$ .............................................. H02J 7/14
[52] U.S. Cl. ........................................ 322/28; 322/22
[58] Field of Search .................... 322/8, 17, 18, 21, 22, 322/23, 24, 25, 28, 29, 99

[56] References Cited

U.S. PATENT DOCUMENTS

| | | | |
|---|---|---|---|
| 4,035,712 | 7/1977 | Yarrow et al. | 322/24 |
| 4,451,776 | 5/1984 | Iwaki et al. | 322/22 |
| 4,459,489 | 7/1984 | Kirk et al. | 322/8 X |
| 4,636,705 | 1/1987 | Bowman | 322/28 |
| 4,883,973 | 11/1989 | Lakey et al. | 322/29 X |
| 4,931,717 | 6/1990 | Gray et al. | 322/18 X |
| 5,061,889 | 10/1991 | Iwatani et al. | 322/28 |
| 5,105,143 | 4/1992 | Marumoto et al. | 322/28 |
| 5,140,253 | 8/1992 | Itoh | 322/28 |

Primary Examiner—Steven L. Stephan
Assistant Examiner—Kristine Peckman
Attorney, Agent, or Firm—Richard A. Bachand; Lisa K. Jorgenson; Richard K. Robinson

[57] ABSTRACT

Regulator circuitry for connection to field coils of an alternator in an electrical system of a vehicle having a system voltage maintained by the alternator includes circuitry for providing a variable drive to the field coils of the alternator, and circuitry for generating a velocity signal related to a rotational velocity of a driven shaft of the alternator. The regulator circuitry also includes circuitry for producing a deviation signal when the system voltage deviates more than a predetermined amount from a predetermined value, and circuitry responsive to the deviation signal to vary the field coil drive to the alternator at a rate dependent upon the velocity signal. In addition a method is presented for regulating the voltage delivered by an alternator in an electrical system having a system voltage maintained by the alternator. The method includes the steps of determining when the system voltage deviates from a nominal value more than a predefined amount; and when the system voltage deviation occurs, varying a pulse width modulation signal to drive the field coils of the alternator at a rate that is related to a rotational velocity of a stator of the alternator.

20 Claims, 3 Drawing Sheets

VOLTAGE REGULATING CIRCUITRY TO VARY THE ALTERNATOR FIELD COIL DRIVE AT A RATE DEPENDENT UPON A ROTOR VELOCITY SIGNAL

BACKGROUND OF THE INVENTION

1. Field of the Invention

This invention relates to improvements in voltage regulator circuits and more particularly to improvements in voltage regulator circuits of the type that maintain the system voltage in a vehicle, or the like, in which electrical loads may be applied to a vehicle alternator at various engine speeds.

2. Description of the Prior Art

Electrical systems of today's vehicles typically use an alternator to convert the mechanical energy transmitted into it via its rotating shaft into electrical energy. The amount of current delivered by an alternator to its load is determined by many factors, such as the rotational speed of the shaft, the voltage of the system, and the amount of current flowing in the field coil of the alternator.

On the other hand, the amount of mechanical energy taken in by the alternator is nearly a linear function of the electrical energy delivered by it to the load: if the load draws twice as much electrical power, the alternator will pull approximately twice as much mechanical power in through its shaft. For a given shaft speed, the different levels of mechanical power are exhibited by variations in torque seen at the mechanical shaft of the alternator.

The rotating part of an alternator spins a coil which is energized via slip rings and brushes. This rotating coil, the "rotor" or "field" coil, sets up a magnetic field which moves through stationary coils, the "stator" coils, whose output is then delivered to the load via rectifiers. The output of the alternator is controlled by a voltage regulator which senses the system voltage and varies the field coil current to set the system voltage to some predetermined value. If the electrical load presented by the vehicle increases, the voltage regulator increases the field coil current, which increases the output current from the stator coils of the alternator until the system voltage is restored to its proper value. When the field coil current is increased, the torque exerted by the alternator through its input shaft and pulley increases.

Rapid changes in the amount of energy pulled by the alternator from the engine through its belt drive can cause several problems. Two that may be noticeable by the operator of the vehicle are belt squeal when the torque is rapidly increased to very high levels and idle surge. The idle surge problem is caused by the fact that modern day engines are made to idle at very low speeds, generally under computer control, to minimize polluting emissions. An engine that is idling may be putting out a total of 2 or 3 horsepower in mechanical energy used to overcome friction within the engine itself and the transmission, drive the alternator, and operate other rotating components on the engine, such as the water pump, air pump, air conditioning compressor, and so forth. The alternator may draw anywhere from 0.1 to 2 horsepower, depending on the electrical load requirements at the time. A rapid increase in the electrical loads, such as a electrically driven cooling fan or lights turning on may cause the alternator to rob the engine of up to half its output. This could push the engine close to stalling, causing the engine control computer to kick up the throttle to prevent the stall. Often the system overshoots and the idle speed briefly surges up to a higher than normal level. This is an undesirable condition.

Due to power dissipation problems, most existing alternator voltage regulators drive the field coil with a pulse width modulated square wave. The frequency of the drive is high enough that the field coil current changes very little during one cycle of the drive. Varying the duty cycle (the ratio of on to off time) changes the average level of field coil current. However, controlling the rate of change of the field coil current will control the rate of change in the torque seen by the engine.

In the past, several systems have been proposed to address these problems. One system proposed by Kirk, et al. in U.S. Pat. No. 4,459,489 uses a constantly fixed rate of increase for the field coil drive. The Kirk, et al. circuit controls the rate of increase in the field drive to a constant maximum at all times. The reaction speed of the system is not determined by the size of the electrical load increase, or by the shaft speed of the alternator. Such systems could suffer from voltage stability problems, because they react slowly to load increases, causing the system voltage to dip to an unnecessary extent, even in response to only small load increases. Additionally, in many such systems, the reaction speed is constant for all engine speeds. When the engine is running faster, it develops a lot of horsepower and is relatively unaffected by the load changes from the alternator. Additionally, the higher rotational velocity means that the belt drive to the alternator experiences less available to transmit a given amount of mechanical energy to the alternator.

Another system that has been proposed by Bowman et al. in U.S. Pat. No. 4,636,706 uses predetermined update rates for the field coil drive. The Bowman et al. circuitry has a reaction time dependent on the shaft speed of the alternator with a piece-wise linear relationship. In this system, if the shaft speed is within a certain range, the rate of increase of the field drive duty cycle has a certain value. For a different shaft speed, the field drive increase will have a different value. At the transition between the two ranges, the field drive increase rate has a step change in value. Implementing this approach generally requires frequency discriminators for sensing the shaft speed. If the alternator is operated at one of the transitions, erratic operation can result.

SUMMARY OF THE INVENTION

In light of the above, it is, therefore, an object of the invention to control the rate of change of the torque of an vehicular alternator by changing the rate of change of the field coil current in a manner such that the rate of increase in field drive is linearly dependent on the stator frequency.

It is another object of the invention to provide a method and apparatus of the type described that is enabled by relatively simple electronic circuits.

It is yet another object of the invention to provide a method and apparatus of the type described which does not have transitions between the system reaction time as a function of alternator shaft speed, and is continuously variable in response time.

It is another object of the invention to provide a method and apparatus of the type described which provides a reaction speed that is related to the speed of the engine with which it is associated.

It is another object of the invention to provide circuitry for providing stator dependant torque control produced by an alternator of a vehicle.

It is still another object of the invention to provide a system that regulates a sensed voltage to within prescribed limits.

In accordance with a broad aspect of one embodiment of the invention, regulator circuitry is presented for connection to field coils of an alternator in an electrical system having a system voltage maintained by the alternator. The regulator circuitry includes circuitry for providing a variable drive to the field coils of the alternator, and circuitry for generating a velocity signal related to a rotational velocity of a stator. Circuitry is provided for producing a deviation signal when the system voltage deviates more than a predetermined amount from a predetermined value, and circuitry responsive to the deviation signal varies the field coil drive to the alternator at a rate dependent upon the velocity signal.

In accordance with a broad aspect of another embodiment of the invention, regulator circuitry is presented for connection to field coils of an alternator in an electrical system of a vehicle including an alternator and a system voltage maintained by the alternator. The regulator circuitry includes an analog to digital converter for connection to receive the system voltage and to deliver a digital output signal representing the system voltage, and a duty cycle generator for connection to the field coils produces an output signal proportional to a digital input signal. Register circuitry registers a value related to the digital output signal of the analog to digital converter and has an output connected to provide the registered value for the digital input signal to the duty cycle generator. System voltage sense circuitry provides an output signal when the system voltage falls below a predetermined value, and circuitry is provided for generating pulses at a frequency related to a rotational velocity of the alternator Control circuitry responsive to the output signal of the system voltage sense circuitry controls the duty cycle generator to produce an output related to the digital output signal of the analog to digital converter when the system voltage is above the predetermined level, and to increment the digital output signal of the analog to digital converter registered in the register circuitry when the system voltage falls below the predetermined value to produce an output that increases at a rate related to the rotational velocity of the alternator.

In accordance with a broad aspect of still another embodiment of the invention, regulator circuitry is provided for connection to field coils of an alternator in an electrical system of a vehicle including an alternator and a system voltage maintained by the alternator. In this embodiment, a clock circuit generates a clock signal, a free running counter outputs a count of the clock signals, and outputs a signal when the count is a predetermined value. Circuitry also is provided for outputting pulses at a frequency related to a rotational velocity of the alternator. A comparator circuit produces a deviation signal when the system voltage deviates from a nominal voltage by more than a predetermined amount, and a register is provided that contains a digital output value that can be incremented or decremented. A comparator circuit compares the count of the clock signals from the free running counter with the digital output value of the register circuit for producing a comparison signal, and a latch circuit is set by the signal of the free running counter when the count is the predetermined value and is reset by the comparison signal. Control circuitry responsive to the deviation signal of the comparator circuitry increments or decrements the register at a rate determined by the clock signal when the system voltage deviates from the nominal voltage by less than the predetermined amount, and increments or decrements the register at a rate determined by the digital output signal of the analog to digital converter when the system voltage deviates from the nominal voltage by more than the predetermined amount.

In accordance with another broad aspect of the invention, a method is presented for regulating the voltage delivered by an alternator in an electrical system having a system voltage maintained by the alternator. The method includes the steps of determining when the system voltage deviates from a nominal value more than a predefined amount; and when the system voltage deviation occurs, varying a pulse width modulation signal to drive the field coils of the alternator at a rate that is related to a rotational velocity of a stator of the alternator.

BRIEF DESCRIPTION OF THE DRAWING

The invention is illustrated in the accompanying drawing in which:

FIG. 3a is a graph of system voltage verses time showing a typical waveform produced by circuitry constructed in accordance with the diagram of FIG. 1 of the system voltage in response to a sudden load applied across the alternator of a vehicle or the like.

FIG. 3b is a graph of field drive duty cycle verses time of a system in accordance with the invention in response to the voltage represented by the waveform of FIG. 3a.

FIG. 4b is a graph of field drive duty cycle verses time, in response to an increased load applied to the alternator, to produce the waveform shown in FIG. 4a.

FIG. 5b is a graph of field drive duty cycle which results from the circuit in accordance with a preferred embodiment of the invention, at low engine speeds to produce the system voltage response shown in the graph of FIG. 5a.

FIG. 6b is a graph of field drive duty cycle verses time illustrating a waveform which results using a circuit in accordance with a preferred embodiment of the invention to produce the system voltage waveform of FIG. 6a.

DETAILED DESCRIPTION OF THE PREFERRED EMBODIMENTS

Figure 1:
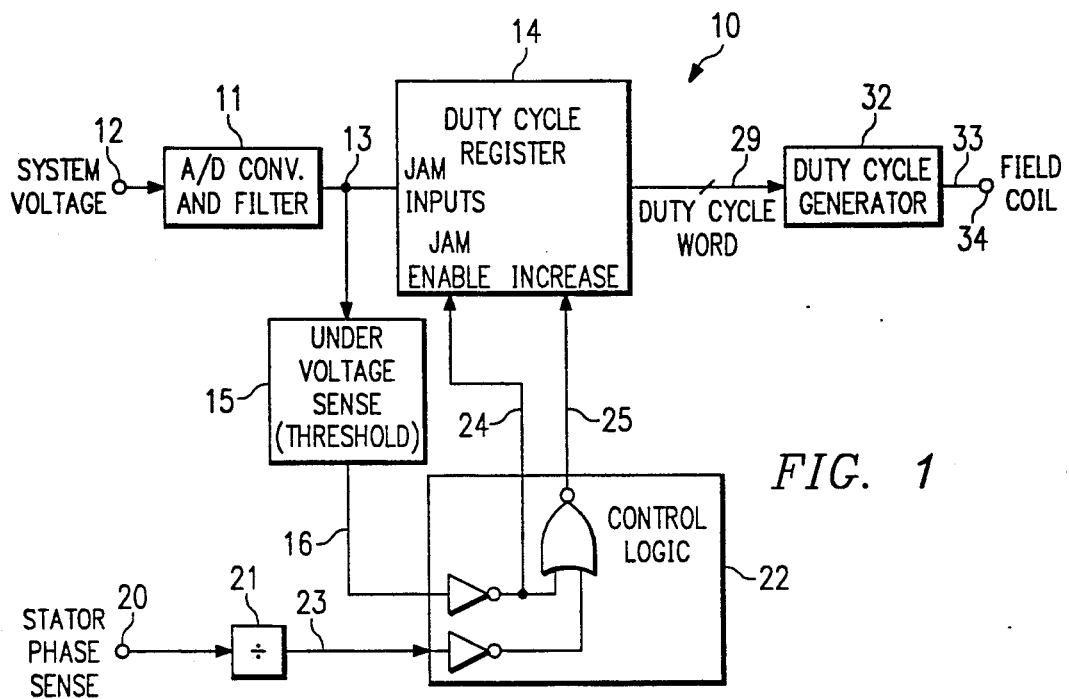
FIG. 1 is a box diagram showing an electrical circuit in accordance with a preferred embodiment of the invention for providing drive signals to the field coil of an alternator for use on an automobile or other vehicle.

A block diagram of a circuit 10, in accordance with a preferred embodiment of the invention, for providing power signals for connection to field coil windings of an alternator of a vehicle (not shown) is illustrated in FIG. 1. The circuitry 10 includes an analog to digital converter and filter 11 that receives at its input the system voltage applied upon node 12. The purpose of the analog to digital converter and filter 11 is to sense the system voltage and provide a digital word which informs successive circuitry of the voltage of the system. The analog to digital converter and filter circuit 11 therefore provides a digital output on the line 13 that is related to the level of the system voltage on the node 12. The digital signal on the line 13 is applied to the "JAM" inputs of a duty cycle register circuit 14, in which they are registered.

The duty cycle register 14 contains the digital word which represents the field drive duty cycle calculated by the system. Inputs to the duty cycle register 14 include "JAM" inputs (presetting data inputs) from the analog to digital converter, a "JAM" enable from the control logic circuitry 22, and an "increase" input from the control logic circuitry 22.

In addition, the digital signal appearing on line 13 from the output of the analog digital converter and filter 11 is applied to an input of an undervoltage sense circuit 15. The output on the line 16 from the undervoltage sense circuit 15 is applied to an input of control logic circuitry 22. The undervoltage sense circuit 15 has a predetermined threshold so that when the value of the input on the line 13 falls below a predetermined value, an output on the line 16 is produced. Thus, the undervoltage sense circuitry 15 monitors the output from the analog to digital converter 11 to inform the control logic circuitry 22 when the system voltage drops below some predetermined threshold voltage. This voltage is the value at which torque control is enabled, as described below.

A signal from the stator of the alternator representing the stator phase may be applied to a node 20 which is connected to an input of a divider circuit 21. The output from the divider circuit 21 is connected to the control logic circuitry 22 by the line 23. The divider circuitry 21 is a simple digital divider, which divides the frequency seen on the stator phase sense input node 20 to feed the "increase" input of the control logic circuitry 22, and in turn the "increase" input of the duty cycle register 14.

The stator phase sense voltage may be derived, for example, from one of the stator coils at a point that may be connected to the connection between the diodes of a diode array of the type generally employed in conjunction with most alternator systems. Such sampling node is typically existing in most alternator systems, for example to signal "no rotation" of the rotor, to indicate a broken drive belt, or other such problem. Thus, the signal on the line 23 represents the rotational velocity of the alternator divided by the divisor established in the divider circuit 21, and by the relationship between the frequency seen at the sampling node and the rotational frequency of the alternator shaft. This relationship is fixed by the physical construction of the alternator.

The control logic circuitry 22 operates to produce a normal output on a line 24 that is connected to the "JAM" enable input of the duty cycle register 14. On the other hand, when a signal appears on the node 12 indicating an undervoltage condition of the system voltage, the signal on the line 23 representing the frequency or rotational velocity of the stator of the alternator is applied via the line 25 to the "increase" input terminal of the duty cycle register circuitry 14, and, concurrently, the signal on the line 24 to the "JAM" enable input is removed.

The duty cycle register circuitry 14 has the digital signal on line 13 from the output of the analog to digital converter and filter circuitry 11 registered therewithin, and, in the presence of the "JAM" enable signal provided on line 24, presents the registered signal on the output line 29, representing a "duty cycle word". The duty cycle generator 32 takes the duty cycle word from the output of the duty cycle register 14 and converts it into the field coil drive waveform. The field drive duty cycle may range from 0% to 100%, depending on the value of the duty cycle word. Thus, the duty cycle word on line 29 is connected to an input of a duty cycle generator circuit 32 which provides on its output line 33 connected to an output node 34 a signal related to the value of the duty cycle word on the line 29.

On the other hand, in the presence of a signal on the increase line 25, the signal on the "JAM" enable line 24 is removed and the value that is registered in the duty cycle register 14 is incremented or increased at a rate determined by the signal on the line 23, which, as above described, is related to the rotational velocity of the alternator. The increasing value registered in the duty cycle register 14 is continuously applied to the output on the line 29, constituting the duty word applied to the input of the duty cycle generator circuit 32.

The invention herein proposed provides for the increase in the rate in the field drive, for instance, linearly dependent on the stator frequency. Through the use of the divider circuit 21, the stator frequency may be sensed to generate an "increase" clock signal, so that at high stator frequencies, the field drive can increase at a high rate and at low stator frequencies, the field drive can increase at a lower rate.

Figure 2:
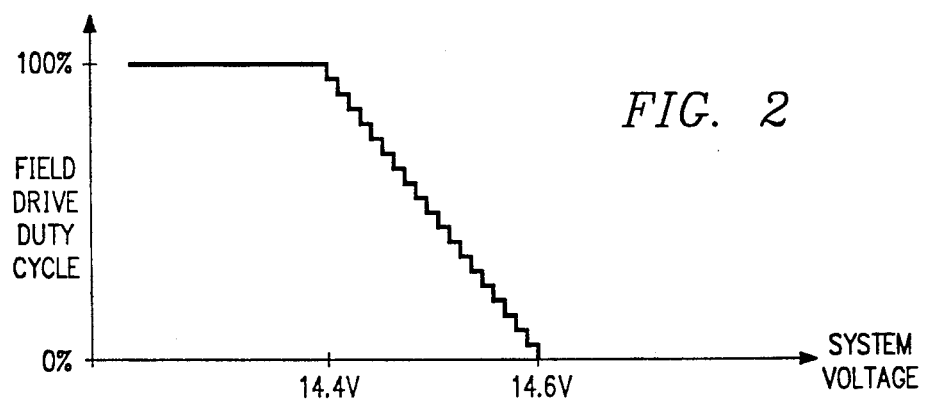
FIG. 2 is a graph showing the relationship between system voltage and field drive duty cycle of a circuit constructed in accordance with the diagram of FIG. 1.

The normal operation of the circuit of FIG. 1 is shown in FIG. 2. Some advantages of this approach over prior circuits are that simpler circuits are required to implement the system, and that there are no transitions in the system operation. This system has a continuously varying response time to load increases, and no problems occur because the system does not bounce between two separate modes of operation, as in some prior approaches. The jagged transfer curve for the proposed system reflects the digital implementation of the circuit and is merely the quantization of the duty cycle as compared to the continuous analog curve.

If the system voltage is below prescribed limits, the field drive duty cycle is increased, increasing the output current from the alternator to the load. This will increase the system voltage until it returns to the normal range, typically between 14.4 V and 14.6 V, as seen in the FIG. 2, and an equilibrium point is reached. Thus, the proposed system emulates conventional systems by allowing the duty cycle register 14 to become transparent. That is, the data fed to the "JAM" Inputs of the duty cycle register 14 are merely fed directly to the duty cycle generator 32, which maps the appropriate duty cycle value as a function of the data word generated by the analog to digital converter 11. During this mode, the control logic circuitry 22 maintains this operation by asserting the "JAM" enable signal to the duty cycle register 14.

Figure 3A:
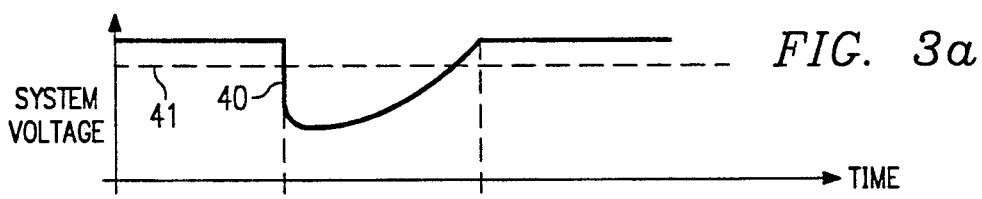
Figure 3B:
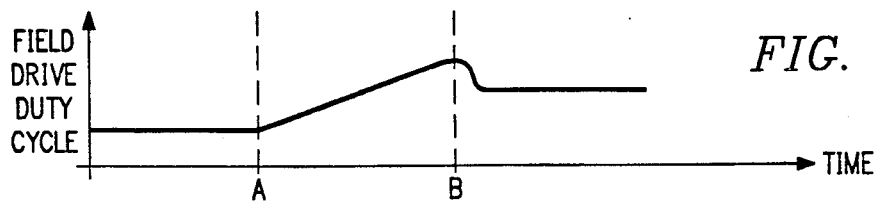

FIGS. 3a and 3b show the operation of the system when a rapid increase in electrical load is encountered. The rapid load change will be marked by a rapid decrease in system voltage, shown by curve 40, to a value below the threshold value 41 indicated by the dotted line. This event occurs at time A. While the system voltage remains below the threshold value 41, the undervoltage sense circuitry 15 flags the control logic circuitry 22. In this operation mode, the control logic circuitry 22 de-asserts the "JAM" enable signal to the duty cycle register 14 and begins feeding the "increase" clock signal to the "increase" input of the duty cycle register 14. Each tick of the "increase" input increases the duty cycle by one count towards 100%. In this way, the duty cycle word is increased at a rate determined by the frequency seen at the stator phase sense input node 20, which reflects the shaft speed of the alternator. Thus, the rate of increase in field drive duty cycle between times A and B is shaft speed dependent. After the system voltage has recovered above the threshold value, the system returns to normal operation as described above.

Figure 4A:
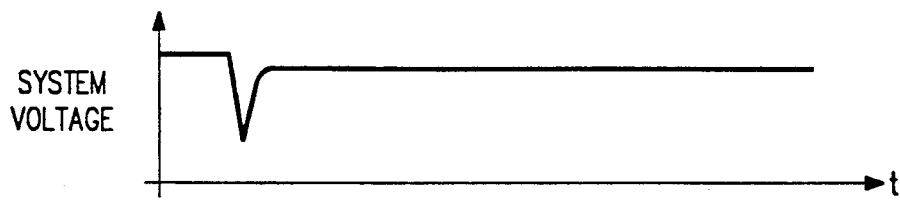
FIG. 4a is a graph of system voltage verses time showing a waveform of the system voltage when a load is applied to the alternator of a vehicle or the like, produced by regulator circuitry of typical prior art circuits.
Figure 4B:
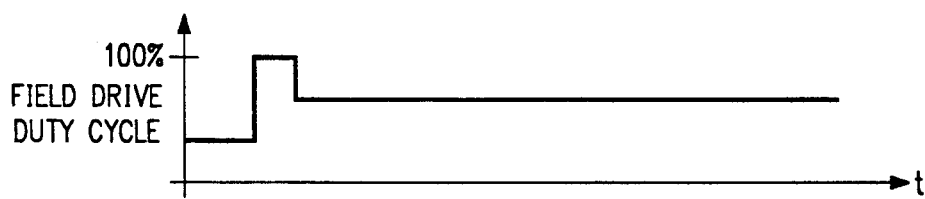
Figure 5A:
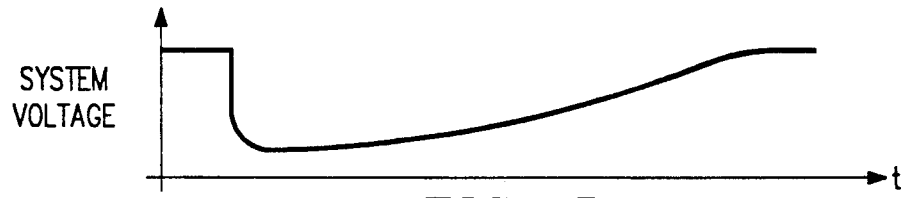
FIG. 5a is a graph of system voltage verses time showing a system voltage response at low engine speeds to a load applied to the system produced by circuitry constructed in accordance with the diagram of FIG. 1.
Figure 5B:
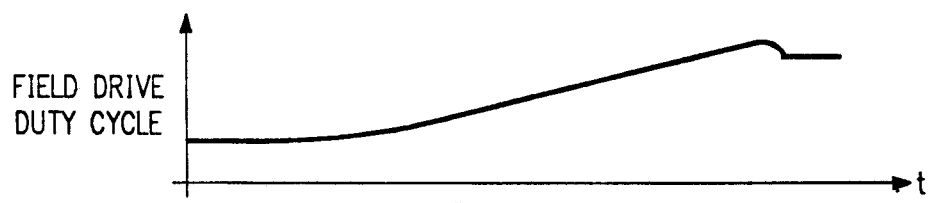
Figure 6A:
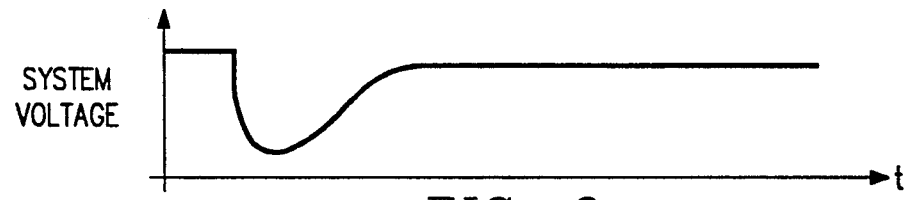
FIG. 6a is a graph of a waveform of the system voltage which results when a load is applied to the alternator at high engine speed produced by circuitry constructed in accordance with the diagram of FIG. 1.
Figure 6B:
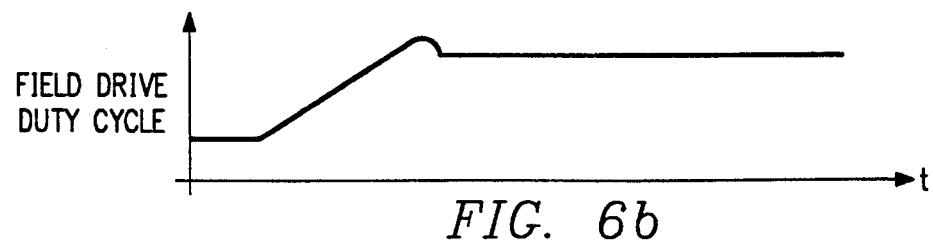

The operation of the system, in accordance with the above embodiment of the invention is to prior art operation illustrated in FIGS. 4a and 4b, which show the rapid response of a typical conventional system. The operation in accordance with the invention is illustrated in FIGS. 5a and 5b which show a slow system response at low engine speeds, employing the system of the invention; and FIGS. 6a and 6b which show a fast system response at high engine speeds. The torque drawn by the alternator from the engine is almost linearly dependent on the field drive duty cycle, assuming a constant engine speed. Thus, with this system, large changes in torque occur slowly when engine speed is low and the engine is subject to stalling, as previously described. When engine speed is high, the torque changes more rapidly, restoring normal system voltage as fast as conditions warrant. Note that all systems look the same before and after the transients, but their behavior during the transition is different.

Figures 7, 8:
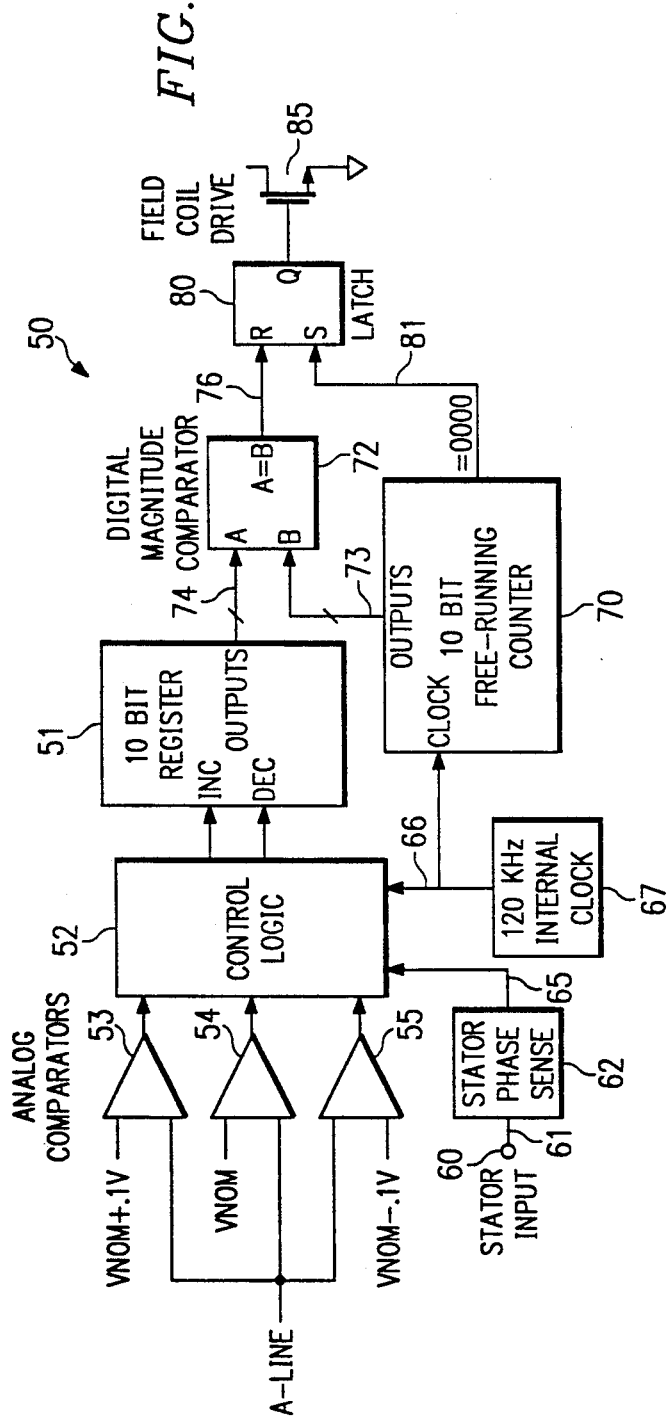
FIG. 7 is a block diagram of an electrical circuit for providing an alternator regulator function in accordance with another preferred embodiment of the invention.
FIG. 8 is an electrical schematic diagram of one control logic circuit embodiment which may be used in the voltage regulator shown in FIG. 7.

With reference now to FIG. 7, another circuit embodiment 50 is provided for regulating the field coil drive of an associated alternator (not shown). The circuit 50 includes a 10 bit register 51 having increment and decrement inputs and an output which provides a digital word or other digital signal output. Signals to the increment and decrement inputs of the 10 bit register 51 are provided by a control logic circuit 52. The control logic circuit 52 receives inputs from three comparators 53, 54, and 55, each of which has an input connected to receive a signal related to the system voltage, labeled "A-LINE". The first comparator 54 receives on its other input terminal a nominal voltage (VNOM) which provides a dither operation of the circuit 50 during normal operation within acceptable limits. The second comparator 53, on the other hand, receives on its other input terminal a voltage equal to the nominal voltage plus 0.1 volts, and operates to decrement the value held in the register 51 at a rapid rate. The comparator circuit 53 alternatively may be used to initiate a shut off operation to temporarily disengage the alternator from the system voltage, for example, in the event of a large voltage surge or spike that might otherwise be damaging to components associated with the electrical system of the vehicle. Finally, the third comparator 55 receives on its other input terminal a voltage equal to the nominal voltage minus 0.1 volts.

A stator input may be connected to an input node 60 to provide a signal on the line 61 to a stator phase sense circuit 62. The stator phase sense 62 provides a signal on its output line 65 related to the rotational velocity of the stator of the alternator, and is connected to an input of the control logic circuitry 52. The last input of the control logic circuitry 52 is provided on a line 66 from a clock circuit 67, having a frequency of, for example, 120 khz.

The output from the clock circuit 67 is additionally applied to a clock input of a 10 bit free running counter circuit 70. The outputs from the 10 bit free running counter 70 are connected to one input of a digital magnitude comparator circuit 72 on a bus 73. In addition, the outputs from the 10 bit register 51 are connected to another set of inputs of the digital magnitude comparator circuit 72 on a bus 74. The digital magnitude comparator 72 operates to produce an output on a line 76 when a value of the digital signals on the bus of 73 and 74 are equal. The line 76 is connected to the reset terminal of a latch 80.

In addition, the 10 bit free running counter circuit 70 provides an output on a line 81 when its count is equal to zero, and the line 81 is connected to the set terminal of the latch 80. The Q output of the latch 80 is connected to the gate of a power FET 85 or a control element other power switching device that may be connected in the field coil drive circuit to control the field coils of the alternator.

FIG. 8 shows one logic circuit embodiment which may be used for the control logic circuitry 52 in FIG. 7. In the circuit, the input and output terminals are illustrated with the respective reference numerals of the lines and circuitry to which they connect in the block diagram shown in FIG. 7. The control logic circuitry 52 can be realized with discrete logic components, or may be constructed utilizing a partially or fully programmed microprocessor or logic gates in a custom integrated circuit.

As described above, the system "A-LINE", which may be the battery line voltage, is sensed by three comparators 53, 54, and 55. The middle comparator 54 compares the "A-LINE" voltage to a nominal value, VNOM. If the "A-LINE" voltage is below the nominal voltage, the control logic circuitry 52 will increment the duty cycle register 51 until the "A-LINE" voltage exceeds the nominal voltage. This causes the control logic circuitry 52 to decrement the 10 bit register 51 and the cycle repeats itself. During normal operation, the 10 bit duty cycle register 51 therefore toggles up and down by one count, but this only results in a change in the field coil drive duty cycle of 0.1%, which should be an acceptable amount of dither.

Thus, in the normal operation of the circuitry 50, when only the output of the comparator 54 is effective, the rate of change of the duty cycle is constant. On the other hand, the other two comparators 53 and 54 become effective to sense when the error voltage (the "A-LINE" voltage minus the nominal voltage) is larger than a predetermined value in either the positive or negative directions, for example 0.1 volt in the embodiment shown. When the error exceeds this predetermined value, the control logic circuitry 52 causes the contents of the duty cycle register to be changed more rapidly than otherwise. The slew rate of the duty cycle will thus adapt to the operating conditions.

The 10 bit free-running counter 70 is normally clocked by the 120 khz clock signal from the clock 67. Thus, the frequency of the control loop is set to about 120 hz, with the free running counter 70 going through bit combinations from all zeros to all ones. When the counter reaches a predetermined count, for example, all zeroes, the "=0000" signal sets the latch 80, which turns on the field coil drive transistor 85. Meanwhile, the digital magnitude comparator 72 monitors the contents of the free running counter 70 and the register 51. When the contents of the counter 70 and the register 51 are equal, the output from the magnitude comparator 72 resets the latch 80 and the field coil drive transistor 85 is turned off, thereby establishing the duty cycle of the circuit 50. Since the value registered in the register 51 establishes the duty cycle of the system, increasing its value increases the duty cycle.

The 10 bit duty cycle register 51 therefore makes the loop behave as if an integrator (pole at zero hz) were embedded in the loop. This means that no matter how large the initial voltage error, the system will eventually settle back to the exact same nominal voltage as long as the final duty cycle is within the normal operating limits.

The acceptable level of dither and loop stability criteria fix the required resolution for the duty cycle and also the possible update frequency for the contents of the register 51, so that the register 51 is not constantly overshooting and undershooting the correct resting value it obtains. This establishes a maximum on the allowable "slew rate" for the duty cycle.

Varying the rate of change of the duty cycle in this manner gives a stable loop, while minimizing the possible response time to large load changes. Load response control can be accomplished by allowing the frequency seen on the stator input node 60 to determine the update rate for the register 51. In this manner, the rotational speed of the alternator will adjust the response time of the regulator to load changes. At low speeds, the regulator would react slowly and at higher speeds, the circuit would settle quickly. Using the stator input in this manner varies the response time in a continuous fashion, eliminating any discontinuities caused by discrete mode changes initiated by a frequency discriminator monitoring the stator input.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

I claim:

1. Regulator circuitry for connection to field coils of an alternator in an electrical system having a system voltage maintained by the alternator, comprising:
    means for sensing the system voltage;
    circuitry for generating a velocity signal related to a rotational velocity of a rotor of the alternator;
    circuitry for producing a deviation signal when the system voltage deviates more than a predetermined amount from a predetermined value of said system voltage;
    circuitry responsive to said deviation signal to vary the field coil drive to the alternator at a rate dependent upon the velocity signal.

2. The regulator circuitry of claim 1 wherein said circuitry for providing a variable drive comprises a duty cycle generator for connection to the field coils of the alternator for generating a pulse width modulated signal for exciting the field coils.

3. The regulator circuitry of claim 1 wherein said circuitry for producing a deviation signal when the system voltage deviates more than a predetermined amount from a predetermined value comprises a comparator circuit.

4. The regulator circuitry of claim 3 wherein said predetermined value is a desired system voltage.

5. The regulator circuit of claim 3 wherein said comparator circuit comprises a comparator having one input connected to the means for sensing the system voltage and another input connected to a predetermined voltage corresponding to the predetermined value.

6. The regulator circuit of claim 1 wherein said circuitry responsive to said deviation signal to vary the field coil drive to the alternator at a rate dependent upon the velocity signal comprises register circuitry for registering a value related to the system voltage and having an output to provide the registered value for input to said variable drive circuitry.

7. The regulator circuit of claim 6 wherein said circuitry responsive to said deviation signal to vary the field coil drive to the alternator further comprises control circuitry for controlling said register circuitry to produce the registered value to said variable drive circuitry when the deviation signal is in one state, and to step the registered value in said register circuitry at a rate related to the rotational velocity of the alternator when the deviation signal is in another state.

8. The regulator circuit of claim 6 wherein said circuitry responsive to said deviation signal to vary the field coil drive to the alternator further comprises a source of clock pulses; a counter for producing a clock pulse count output; and control circuitry for controlling said register circuitry to produce a value incremented by the clock pulses to a predetermined clock pulse count when the deviation signal is in one state, and to increment the registered value in said register circuitry at a rate related to the rotational velocity of the alternator when the deviation signal is in another state.

9. The regulator circuitry of claim 1 wherein said alternator is a part of an electrical system of a vehicle.

10. Regulator circuitry for connection to field coils of an alternator in an electrical system of a vehicle including an alternator and a system voltage maintained by the alternator, comprising:
    an analog to digital converter for connection to receive the system voltage and to deliver a digital output signal representing the system voltage;
    a duty cycle generator for connection to the field coils to produce an output signal proportional to a digital input signal;
    register circuitry for registering a value related to the digital output signal of the analog to digital converter and having an output connected to provide the registered value for the digital input signal to said duty cycle generator;

system voltage sense circuitry for providing an output signal when the system voltage falls below a predetermined value;

circuitry for generating clock pulses at a frequency related to a rotational velocity of the alternator;

and control circuitry responsive to the output signal of said system voltage sense circuitry for controlling said duty cycle generator to produce an output related to the digital output signal of said analog to digital converter when the system voltage is above the predetermined level, and to step the contents of the register circuitry when the system voltage falls below said predetermined value to increase field coil drive to the alternator at a rate related to the rotational velocity of the alternator.

11. The regulator circuitry as claimed in claim 10 wherein said circuitry for generating clock pulses at a frequency related to a rotational velocity of the alternator comprises a divider circuit connected to receive a signal related to the rotational velocity of the alternator and to deliver a divided rotational velocity output signal to said control circuitry.

12. The regulator circuitry as claimed in claim 11 wherein said control circuitry is connected to said register circuitry to increment the signal registered in said register circuitry in accordance with said divided rotational velocity output signal.

13. Regulator circuitry for connection to field coils of an alternator in an electrical system of a vehicle including an alternator and a system voltage maintained by the alternator, comprising:

a clock circuit for generating a clock signal;

a comparator circuit for producing a deviation signal when the system voltage deviates from a nominal voltage by more than a predetermined amount;

a register that contains a digital output value that can be incremented or decremented;

a free running counter to output a count of the clock signal, and to output a signal when the count is a predetermined value;

circuitry for outputting pulses at a frequency related to a rotational velocity of the alternator;

a comparator circuit for comparing the count of the clock signal from said free running counter with the digital output value of said register for producing a comparison signal;

a latch circuit connected to be set by the signal of said free running counter when the count is the predetermined value and to be reset by said comparison signal;

and control circuitry responsive to the deviation signal of said comparator circuit for incrementing or decrementing said register at a rate determined by said clock signal when the system voltage deviates from the nominal voltage by less than the predetermined amount, and for incrementing or decrementing said register at a rate determined by said digital output signal of said analog to digital converter when the system voltage deviates from the nominal voltage by more than the predetermined amount.

14. The regulator circuitry of 13 wherein said comparator circuit produces a comparison signal when said comparison finds equality, and wherein said latch circuit is reset by said comparison signal when said comparison signal indicates that said comparator has found equality.

15. The regulator circuitry of claim 13 wherein said free running counter and said register contain the same number of digital bits.

16. A method for regulating the voltage delivered by an alternator having field coils in an electrical system having a system voltage maintained by the alternator, comprising:

determining when the system voltage deviates from a nominal value more than a predefined amount; and when said system voltage deviation occurs, varying a pulse width modulation signal to drive the field coils of the alternator at a rate that is related to a rotational velocity of a rotor of the alternator.

17. The method of claim 16 wherein said step of determining when the system voltage deviates from a nominal value more than a predefined amount comprises providing a comparator circuit that compares the system voltage with the nominal value.

18. The method of claim 16 wherein said step of varying a pulse width modulation signal to drive the field coils of the alternator at a rate that is related to a rotational velocity of a rotor of the alternator comprises providing a digital register to contain a digital value to determine the duty cycle of the pulse width modulation signal, and incrementing and decrementing the digital value at a rate dependent upon the rotational velocity of the rotor of the alternator.

19. The method of claim 18 further comprising providing a clock signal for incrementing and decrementing the digital value when the deviation is less than the predefined amount.

20. The method of claim 18 further comprising incrementing and decrementing the digital value at a rate dependent upon the rotational velocity of the rotor of the alternator when the deviation is greater than the predefined amount, and not incrementing and decrementing the digital value when the deviation is less than the predefined amount.

* * * * *